United States Patent Office 3,030,300
Patented Apr. 17, 1962

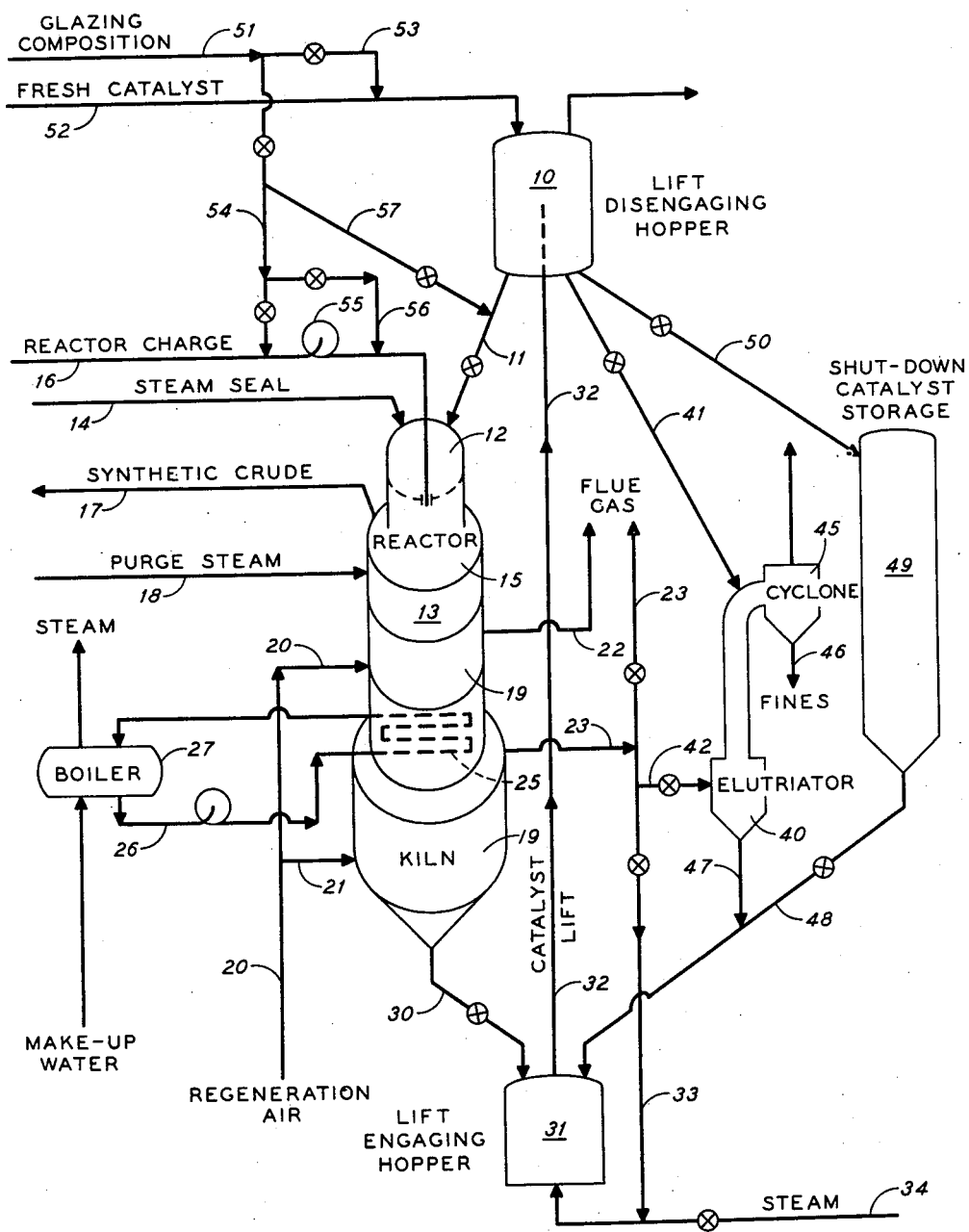

3,030,300
CATALYTIC CRACKING WITH AN ATTRITION RESISTANT CATALYST
Robert L. Flanders, San Anselmo, Calif., Frank M. Parker, Salt Lake City, Utah, and Harold E. Knowlton, Pleasant Hill, Calif., assignors to California Research Corporation, San Francisco, Calif., a corporation of Delaware
Filed Dec. 11, 1957, Ser. No. 702,066
22 Claims. (Cl. 208—114)

This invention relates to the conversion of petroleum hydrocarbons in a cracking unit of the moving-bed type. More specifically, the invention provides a method for increasing the efficiency and selectivity of the unit, while also effecting a substantial reduction in catalyst losses occasioned by impact breakage and abrasion of the catalyst surfaces.

In hydrocarbon cracking units of the moving-bed type, which are commonly designated as Thermofor or Houdriflow units, there are employed siliceous catalyst masses made up of small beads, pellets or extruded shapes ranging in diameter from about 500 microns to ¼". While these units vary somewhat in the nature and arrangement of their component elements, all incorporate a reaction vessel, wherein conversion of the hydrocarbon feed takes place, and a catalyst regenerator, together with associated catalyst transfer equipment of the mechanical or gas lift types, as well as suitable feed and product recovery facilities. In the operation of the units, active catalyst from the regenerator is continuously supplied to the upper portion of the conversion zone and gravitates downwardly therethrough while in contact with the hydrocarbon feed which is also continuously supplied to the reactor. The spent catalyst leaving the reactor is stripped of any remaining reaction products and unconverted hydrocarbon and is then passed to the regenerator for reactivation in the usual manner by contact with an oxygen-containing gas. In some units the regenerator, or kiln is so positioned below the reactor that the stripped catalyst gravitates downwardly into the regeneration zone, while in other types of units the catalyst is lifted mechanically to the regenerator. In either case, the regenerated catalyst is returned to the conversion zone, usually by way of an intermediate storage hopper from which the catalyst gravitates to the reactor. In many units, transfer of the reactivated catalyst to the hopper is made by means of a gas lift, though with others resort is again had to a mechanical hoist system to effect this catalyst transfer.

In the operation of the foregoing units, it is important that the catalyst employed be as strong and attrition-resistant as possible in order to minimize the amount of catalyst which is broken or otherwise comminuted into small fragments, which are collectively referred to herein as "fines." It is known that these fragments lower the operating efficiency of the unit, and every effort is made, therefore, to effect their removal from the system by means of various cyclone separators and catalyst elutriators. Specifically, the presence of these fines in the system is disadvantageous, since they tend to classify or gather together in relatively compact masses in the reactor as well as in the stripping and catalyst regeneration zones. As a result, the various gaseous streams passed through the catalyst masses tend to channel and thus impair contact efficiency while also increasing the pressure drop through the mass. In addition to these operating disadvantages attributable to the presence of fines in the unit, large sums must be continuously expended to replace these catalyst fragments with fresh, unbroken catalyst material. For example, in the case of petroleum cracking plants of even moderate capacity, expenditures for make-up catalyst may range from $1000 to $3000 or more per day.

It is a general object of this invention to provide a method whereby, in the operation of petroleum hydrocarbon cracking units of the moving-bed type, catalyst losses in the form of fines are materially reduced thereby significantly lowering catalyst make-up costs and improving the over-all operating efficiency of the unit. A more particular object is to provide a hydrocarbon conversion method of said character wherein an attrition-resistant, generally discontinuous protective glaze is established on the exterior, or macrosurface of the individual catalyst particles, and is continuously maintained thereon as the unit remains in operation.

The present invention rests on the disclosure that the foregoing and other objects are attained by uniformly and continually supplying the consummate mass of particulate siliceous catalyst being circulated in the unit, while said catalyst is in the active condition, with a total of from about 0.002 to 0.25% by weight, on an average daily basis, of at least one compound selected from the group consisting of alkali metal, alkaline earth metal and boron compounds which, under the elevated temperature conditions experienced in the regeneration zone of the unit, present the metal components of said added compounds in a condition whereby the latter will react with the siliceous surface of the catalyst, under said elevated temperature conditions, to form a generally discontinuous glaze or glass-like film on the macrosurface of the catalyst particles comprising said consummate mass. By operating in this fashion, it is possible to reduce catalyst losses in the form of fines and other small fragments by as much as from 50 to 90%. The resultant savings in catalyst replacement costs alone are large, and when coupled with the enhanced processing advantages also obtained, the value of the present invention becomes even greater. While amounts larger than 0.25% of the additive composition can normally be employed without deleterious results, the use of such larger amounts is relatively uncommon, since it confers no added benefits over and above those obtained with the lesser amounts falling in the 0.002–0.25% range.

It is contemplated that the glazing composition shall be continually supplied to the cracking unit at the aforementioned rate over substantially the entire period during which the unit is maintained in operation if maximum benefits of this invention are to be obtained. While the amounts specified for the additive composition are given on a per diem basis, it is not necessary that the composition be so supplied. That is to say, while it is preferred to inject the composition without interruption into a given section of the unit (which method may be described as intermittent with reference to catalyst being circulated through said section), good results may also be had when the additive composition is supplied to the unit (at a correspondingly higher rate) only from time to time, for example, during every other day or even every third or fourth day. However, the glaze is being constantly worn from the circulating catalyst surfaces, and it has been found that as addition of the glazing composition is discontinued for three or four days, the production of fines rises to levels which are well above the optimum level which may be reached when the composition is added more or less constantly at a rate found to give minimal attrition losses in the particular cracking unit involved.

The desired glaze-forming composition is applied to the active catalyst being circulated in the cracking unit in any convenient fashion. By "active catalyst" is meant that which is fresh or that which is in the regenerated condition. In the case of units where the feed is supplied to the conversion zone in the liquid or the mixed liquid-vapor form, a preferred practice is to introduce the additive composition into the feed stream passing to the reaction zone. With vapor-feed units, the additives are supplied to the catalyst at any point after the catalyst leaves the regenerator and before it has been appreciably deactivated by contact with feed in the reaction zone, it having been found that good results from the standpoint of providing a satisfactory glaze on the catalyst surfaces cannot be obtained when the glazing composition is supplied to catalysts which already bear substantial amounts of carbonaceous deposits and have thus been appreciably deactivated. Accordingly, with vapor-feed units (as well as with those of the liquid feed type, if desired) the glazing composition can be supplied to the catalyst traveling from the regenerator to intermediate hopper storage, to the catalyst in said storage or gravitating downwardly therefrom to the reaction chamber, or even to the catalyst which is in said chamber provided that the addition be made before the catalyst has become appreciably deactivated. Other points in the system may also be selected for addition of the glazing composition. For example, with units incorporating an elutriator section the composition may readily be applied to the catalyst being returned from said section to the lift engaging hopper.

It is also possible to pretreat fresh catalyst with the glazing composition before introducing the same into the cracking unit (with the glaze thus being formed in the system as the catalyst is circulated therein), or to provide said catalyst with a glaze before it is added to said unit. Such preglazing can be effected, for example, by spraying the fresh catalyst with a dispersion of from about 0.01 to 2% (in terms of the catalyst weight) of a glazing composition in a heavy gas oil and thereafter heating the catalyst to temperatures above about 1000° F. while passing air therethrough, thus in effect regenerating the catalyst while laying down the glaze thereon. Alternatively, the glazing composition may be dusted on or otherwise applied to the catalyst, with the glaze then being formed by heating the coated catalyst particles to a suitable temperature, e.g., 1500–1600° F. for 20–30 minutes, in the case of many glazing compositions. However, it should be noted that any such preglazing step affords only temporary protection, since new increments of glaze must be supplied to the catalyst surfaces as the catalyst is thereafter employed in the unit, if full benefits of the process are to be obtained.

The process of this invention can be successfully utilized in conjunction with operations employing any one or more of a wide variety of siliceous catalyst particles, by which is meant those containing above about 40% by weight of silica. Representative materials falling into this category are the various natural and treated clays of the bentonite, halloysite and kaolin types, and the many synthetically prepared silica catalysts, including those containing one or more other oxides such as alumina, magnesia, zirconia or the like, as heretofore proposed for admixture with silica for use in cracking operations. Thus, excellent results have been obtained with synthetic, silica-alumina cracking catalysts comprising from about 70 to 90% silica and 10 to 30% alumina, as well as with acid-treated, natural clay catalysts containing approximately equal amounts of silica and alumina. Good results have also been obtained with mixtures of the two said catalysts. The catalyst particles to be glazed may be of any desired shape, e.g., spherical, rod-like, as obtained by extrusion, crushed aggregate or the like.

The additive composition, can, if desired, be supplied to the conversion unit in the dry condition (as a powder or in the form of readily friable pellets), or it may be supplied as a dispersion in an aqueous or a hydrocarbon vehicle, which dispersion may then readily be pumped at the desired rate into the feed stream or sprayed or otherwise distributed onto the active catalyst. This dispersion may be molecular in character (i.e., a true or partial solution of the additives in the vehicle), or it may take the form of a suspension of the finely divided materials in the vehicle.

As has been stated above, the additive composition which is supplied to the active catalyst surface in order that a protective glaze may be formed and maintained thereon as the catalyst remains in service, is comprised of one or more boron, alkali metal or alkaline earth metal compounds of the type which are capable of combining with the silica and other elements of the catalyst composition to form a glaze at the elevated temperature conditions encountered in the catalyst regeneration zone of the unit, or which are capable of being converted to said compounds in said zone. The following compounds are representative of those which can be used either singly, or in any desired combination, to form the glazing composition for application to the catalyst particles: NaCl, $Na_2CO_3$, KCl, $K_2CO_3$, LiF, $Li_2SO_4$, $Cs_2CO_3$, $Rb_2CO_3$, $BeF_2$, $BeCl_2$, BeO, $BeCO_3$, MgO, $MgCl_2$, $MgSO_4$, $MgCO_3$, CaO, $Ca_3(PO_4)_2$, $CaF_2$, $CaCO_3$, Ca oleate, Ca naphthenate, Mg oxalate, Ca sulfonate, Na oleate, SrO, $SrCO_3$, $SrF_2$, $BaCl_2$, $BaCO_3$, BaO, Ba naphthenate, $B_2O_3$, $Na_2B_4O_7$, $$Na_2B_4O_7 \cdot 10H_2O$$

$Ca(BO_2)_2$, $CaB_4O_7$ and $Mg(BO_3)_2$. A preferred class of additives is that made up of alkaline earth compounds and/or boron compounds which are free of halogen and alkali metal constituents. Particularly good results have been obtained with $B_2O_3$, $CaCO_3$, $H_3BO_3$, $BaCO_3$ and compositions containing 1–25% MgO, 30–75% $CaCO_3$ and 25–50% $Ca_3(PO_4)_2$. In this preferred grouping, it is intended that carbonates may be replaced in whole or in part by the equivalent oxides, since the latter are formed at glazing temperatures, in any event.

The glaze formed on the catalyst particle incorporates the aforesaid additives (or such compounds as may be formed therefrom at the elevated temperatures employed, e.g., $CaCO_3 \rightarrow CaO$), along with silica, and such alkali metal oxides, alumina or other compounds as may be present in the catalyst composition. In the case of additive compositions rich in phosphate components, the resulting glaze may contain substantial amounts of metaphosphate glasses in addition to the silicate glasses present. In any event, the glaze comprises but a small percentage of the over-all catalyst weight. Thus, in the case of catalyst particles employed in moving-bed processes, the metal constituents of the glaze make up less than about 0.3% by weight of the particle, and most frequently said content ranges from about 0.005 to 0.05 wt. percent, as determined by emission spectograph methods.

Reference has been made above to the fact that the glaze provided by a practice of this invention is discontinuous and extends over a substantial proportion less than the entire macrosurface of the individual catalyst particles. Expressed otherwise, the catalyst particles may be said to bear a glaze coating having a generally filigree-like appearance. Such discontinuity is in many cases evident on examining the surface under a microscope, though it is believed that whenever tests disclose the glazed catalyst to have substantially unimpaired catalytic and surface area characteristics, it may reasonably be concluded, apart from physical examination, that the glaze is discontinuous. Thus, the surface area of the glazed catalyst particles of this invention, as measured by $N_2$ adsorption methods, is normally at least 90% that of the corresponding unglazed particles, and more frequently the respective surface areas of the glazed and unglazed materials appear to be substantially the same. Likewise, in the case of catalyst particles employed in moving-bed processes at least, glazing does not effect any immediate impairment in catalyst activity as determined by "Cat. A" method or by an analysis of the product yield structure in actual plant operation.

A practice of the present invention greatly reduces catalyst losses due to impact breakage and abrasion. This saving manifests itself in a number of ways. Thus, as the unit is maintained in operation it is found that daily catalyst make-up rate is reduced by a substantial margin, the saving ranging from about 25 to 50% in the case of cracking units of the mechanical lift type (where attrition of catalyst is less severe), to from about 50 to 90% in the case of those units where the catalyst is transferred by means of a gas.

Further, the glazed catalyst has been shown to have a reduced frictional coefficient as evidenced by a lower angle of repose assumed by a mass of the catalyst. As a result, the catalyst does not tend to hold up, or bridge in the various sections of the unit, but flows readily therethrough at all times, thereby effecting a decided improvement in the efficiency and, indeed, the very operability of the unit. Further, the low friction characteristic of the catalyst acts to reduce erosion on the various catalyst transfer lines, notably at points of impact where the moving catalyst is directed against adjacent wall surfaces.

It has also been observed that major catalyst losses occur whenever the unit is shut down for any given reason and then started up again, or when the catalyst in a given system is withdrawn and replaced by fresh catalyst. These losses occur largely as the result of free fall of the catalyst in partially empty vessels and (in the case of airlift units) of wild turbulence during start-up. It has been found that the process of the present invention reduces these losses by as much as 60%, while at the same time making the start-up operation much more smooth and rapid.

In addition to the foregoing advantages, which are largely concerned with reduced catalyst losses per se, a practice of this invention leads to numerous process advantages as well. Thus, with a substantial reduction in the fines content of the circulating catalyst mixture (which content is in many cases lower than that presently obtainable even when operating catalyst elutriating sections and cyclone separators at maximum efficiency) the moving catalyst beds formed in various sections of the unit become extremely uniform in character. That is to say, said beds are substantially free of relatively compact sections largely made up of fines and formed as a result of fines classification as the catalyst gravitates through the unit.

Such uniformity of the catalyst beds is highly desirable for a number of reasons. Firstly, it improves contact efficiency in the various reactor, stripping and regeneration zones of the unit. In the reactor section, this makes for increased conversion levels and better selectivity, and in the stripping zone for increased product removal and a resultant decrease in the coke load on the catalyst entering the regenerating section. This, in turn, makes for increased coke burning capacity in the latter section, which capacity is also increased as a result of better distribution therein of the air streams employed to effect burning. This increased efficiency in the regenerator has the incidental effect of reducing after-burning of gases (i.e., of CO to $CO_2$) in those conduit portions lying adjacent the regenerating kiln which receive the flue gases, thereby greatly increasing the useful life of such conduit portions.

Bed uniformity is also of importance in that it largely obviates channeling of gases therethrough and thus balances the pressure drop across each such bed in the unit. With lower pressure drop, it becomes possible to operate the unit at lower net reactor pressures, thereby obtaining increased vaporization of the fresh feed and better distribution of the feed over the fresh catalyst, at least in the case of liquid feed operation.

Likewise, in the substantial absence of fines bodies throughout the catalyst, there is better and more uniform temperature distribution throughout each catalyst mass. This is particularly important in the regenerator kiln where localized hot spots, which seriously damage the catalyst and regenerator internals, tend to form in nonuniform beds.

With decreasing fines content, it has also been noted that the flue gas plume discharged to the atmosphere loses its dark color, a result which is attributable to the decreased content of oil-bearing fines in the gases discharged from the regenerator, and to better stripping of the catalyst as it leaves the reaction zone.

Perhaps the most important of the process advantages attained by a practice of this invention is that, with catalyst attrition losses now inherently reduced to extremely low levels, catalyst circulation rates and hence hydrocarbon feed rates can be increased in substantial measure with but a modest increase in the fines level over the minimal values otherwise prevailing in the unit. The increase so obtained in the capacity of the unit is of great importance from the economic standpoint.

It is believed that the present invention will be very fully understood from a consideration of the figure of the accompanying drawing, which is a simplified flow scheme of a Houdriflow type of moving bed unit for cracking petroleum hydrocarbons. In said figure, the catalyst gravitates downwardly from lift disengaging hopper 10 through lines 11 to the top seal section 12 of the combined reactor-regenerator unit shown generally at 13, steam being supplied to said section through line 14 to effect said seal. The active catalyst then enters reactor section 15 where it is contacted with fresh vapor or liquid feed supplied from line 16. Vaporous reaction products are discharged from the reactor via line 17 along with residual products displaced from the catalyst by steam purge gases introduced through line 18. The stripped catalyst gravitates downwardly into the kiln portion 19 of the unit where it is regenerated by contact with air introduced through lines 20 and 21, the resulting combustion (flue) gases being discharged from the regenerating section through lines 22 and 23. Most of the heat liberated by the feed is absorbed by the catalyst and utilized in the reactor to heat the incoming coke burning step. Any excess heat is extracted from the catalyst and recovered in the form of steam by means of the cooling coil 25 to which water is supplied through line 26 from the boiler 27.

The regenerated catalyst gravitates downwardly from kiln 19 through line 30 into the lift engaging hopper 31 from which the catalyst is lifted through line 32 into the lift disengaging hopper 10 under the influence of a mixture of flue gas from line 33 and steam from line 34, thereby completing the catalyst cycle.

An elutriator 40 is provided into which catalyst from hopper 10 is continuously introduced in relatively minor amounts through line 41. Elutriation of the catalyst is effected by passing flue gas therethrough from line 42, which gas carries fines into a cyclone separator 45 where fines are removed for discharge from the system through line 46. The larger catalyst particles from the elutriator 40 are returned to the main catalyst circulating system through lines 47 and 48 to hopper 31.

Provision is made of a storage vessel 49 to receive the catalyst from the hopper 10 via line 50, during any shutdown of the unit, with the catalyst being reintroduced to the system through line 48.

The glazing composition is supplied to the system through line 51 either in the form of a dispersion in an aqueous or hydrocarbon vehicle, or in the form of a dry powder or as friable pellets which rapidly disintegrate to a powder on coming into contact with a body of moving catalyst. From line 50 the glazing composition can be introduced to the unit at any convenient point. Thus, in the case of a liquid feed unit, the glazing mixture may be passed into the fresh, make-up catalyst supply line 52 via line 53, or it may be directed through lines 54 or 56 (disposed on opposite sides of the pump 55) into the hydrocarbon feed line 16, it thus contacting the active catalyst (along with the feed) in the uppermost portion of reactor 15. Alternatively, the glazing mixture may be passed through line 57 and thus brought into contact with the active catalyst in line 11 as the latter gravitates downwardly from lift disengaging hopper 10.

As has been stated in a foregoing portion of this specification, addition of the glazing composition can be made either in an uninterrupted fashion or in some intermittent manner provided that the intervals between additives be not unduly long (i.e., more than a few days) and that the composition be supplied uniformly to substantially all portions of the catalyst in the system at the time of each addition. In either case, the addition of the glazing composition is referred to herein and in the claims as being of a continual nature, since the result is to maintain the glaze on the catalyst particles as the unit remains in operation for extended periods of time.

It is believed that the nature of the present invention will be more fully understood from a consideration of the data presented in the following examples. Of these examples, Nos. 1–26 are based on laboratory, or bench scale runs, made to evaluate the efficacy of various proposed glazing compositions. The data so obtained has been found to correlate well with the results obtained when similar additive compositions are introduced on a plant scale as reported in Examples 27 and 28.

EXAMPLES 1–9

In the operations covered by these examples, a glaze was provided on synthetic, silica-alumina beads having an average diameter of about ⅛ inch and containing approximately 87% $SiO_2$ and 13% $Al_2O_3$. These beads represented an equilibrium mixture withdrawn from a moving bed catalytic cracking unit of the bucket lift type. The technique employed in glazing the catalyst particles was to select a 600 g. sample of essentially whole catalyst particles and to bring said sample to 900° F. in a rotating muffle furnace capable of constantly turning the mixture. The heated catalyst particles (which were relatively free of any carbonaceous deposits) were then sprayed over the course of one minute with 30 cc. of a high boiling gas oil containing a total of 1.38 g. of the desired glaze-forming additives, said additives being present in the form of a dispersion of finely divided powder in the oil. This represented the addition of approximately 0.23% of the additive, or additive composition, based on catalyst weight. Following the addition of the oil containing the glaze-forming additives, the temperature of the mixture was gradually raised to 1100° F. over the course of the ensuing 10 minutes. During the last seven minutes of said period, and for the next 33 minutes, air was passed through the hot (1100° F.) catalyst to burn th carbonaceous deposits present thereon. Steam, at the rate of 90 cc. $H_2O$/hr., was added during the entire glazing operation, the more closely to simulate conditions encountered in actual operation of the refinery unit.

The treated catalyst beads, which now appeared to have a discontinuous, filigree-like coating of glaze thereon (calculated as being of the general order of 0.02% of the over-all catalyst weight), were cooled and tested for resistance to loss by attrition. In making this test, 200 g. of glazed beads of a size sufficient to be retained on a 10-mesh screen were placed in a unit having a closed, cyclic path whereby the beads were reintroduced every few seconds during the test period into a rising air blast for discharge against the lower side of a steel plate having a dependent skirt portion serving to guide the beads into the lower portion of the unit for reintroduction into the air stream. Portions of the fines produced during the test were carried out with the escaping lift gases, while the remaining fines and other small catalyst fragments formed were separated as the beads remaining on a 10-mesh screen were segregated and weighed. The difference in weight between the original sample (200 g.) and that of the on-10-mesh material remaining at the conclusion of the run was then determined and compared with that experienced by the unglazed "control," the percent improvement in attritional loss so calculated being given in Table I below.

Table I

| Example No. | Additive Composition (Relative Percent of 1.38 g. Total) | | Improvement In Attrition Loss, Percent |
|---|---|---|---|
| 1 | $CaCO_3$ | 100 | 28 |
| 2 | $Ca_3(PO_4)_2$ | 100 | 30 |
| 3 | $MgO$ | 100 | 8 |
| 4 | $CaCO_3$ | 60 | 37 |
|   | $Ca_3(PO_4)_2$ | 40 | |
| 5 | $Ca_3(PO_4)_2$ | 81 | 36 |
|   | $MgO$ | 19 | |
| 6 | $CaCO_3$ | 85 | 21 |
|   | $MgO$ | 15 | |
| 7 | $CaCO_3$ | 52 | 45 |
|   | $Ca_3(PO_4)_2$ | 39 | |
|   | $MgO$ | 9 | |
| 8 | $CaCO_3$ | 50 | 35 |
|   | $Na_2CO_3$ | 50 | |
| 9 | $Na_2CO_3$ | 100 | 25 |

It will be observed from the foregoing examples that catalyst masses made up of glazed, siliceous particles are much more resistant to abrasion and to impact breakage than the corresponding unglazed materials. This increased attrition-resistance is accompanied in many instances by improved catalyst selectivity, as reflected in an increase in gasoline production and by a decrease in the amount of feed going to coke and dry gas as measured by the "Cat. A" method (J. Alexander and H. G. Shimp, National Petroleum News (1944), vol. 36, at page R–537; J. Alexander, Proc. Am. Petroleum Inst. (1947), vol. 27 at page 51). Thus, the unglazed catalyst treated in the foregoing examples, which is representative of plant mixtures and has a surface area of 139 m.²/g., showed a gasoline yield of 29.4% and coke and dry gas yields of 2.4% and 5.6%, respectively, when tested by the Cat. A method. In contrast, the glazed catalyst of Example 7, which, in turn, is considered to be a fully representative, glazed catalyst material of this invention, and which has a surface area of 137–142 m.²/g., showed gasoline, coke and dry gas yields of 30.4%, 2.1% and 4.2%, respectively, in Cat. A tests.

EXAMPLES 10–17

The operations covered in these examples were conducted in the same general fashion as those of Examples 1–9. Here, however, the catalyst employed was made up of small (⅛ x ¼″) extruded pellets of an activated kaolin clay catalyst containing approximately equal amounts of silica and alumina. In the case of Examples 10–15 the glaze was laid down on a fresh catalyst, while that of Examples 16 and 17 was formed on an equilibrium mixture withdrawn from a moving-bed cracking unit. Table II below shows the benefits obtained in the indicated glazing treatments.

Table II

| Example No. | Additive Composition (Relative Percent of 1.38 g. Total) | | Improvement In Attrition Loss, percent |
|---|---|---|---|
| 10 | $BaCO_3$ | 100 | 42.5 |
| 11 | $BaCO_3$ | 52 | 24.6 |
|   | $Ca_3(PO_4)_2$ | 40 | |
|   | $MgO$ | 8 | |
| 12 | $CaF_2$ | 100 | 25.2 |
| 13 | $CaCO_3$ | 100 | 31.2 |
| 14 | $Na_2B_4O_7 \cdot 10H_2O$ | 100 | 31.7 |
| 15 | $BaCl_2$ | 100 | 37.8 |
| 16 | $BaCO_3$ | 100 | 19.1 |
| 17 | $Ca_3(PO_4)_2$ | 50 | 14.9 |
|   | $CaCO_3$ | 50 | |

EXAMPLES 18–23

The operations covered by these examples were also conducted under essentially the same conditions as described above in connection with Examples 1–9, except that here the catalyst being glazed was an extrudate formed from activated halloysite clay. Table III presents data obtained with this catalyst, Examples 18 and 19 involving the glazing of fresh catalyst, while Examples 20–23 are based on a similar treatment of an equilibrium catalyst from a moving-bed type of cracking unit.

*Table III*

| Example No. | Additive Composition (Relative Percent of 1.38 g. Total) | | Improvement In Attrition Loss, Percent |
|---|---|---|---|
| 18 | $CaF_2$ | 100 | 60.4 |
| 19 | $BaCO_3$ | 100 | 51.1 |
| 20 | $BaCO_3$ | 100 | 43 |
| 21 | $CaF_2$ / $Ca_3(PO_4)_2$ | 50 / 50 | 53.8 |
| 22 | $H_3BO_3$ | 100 | 29.9 |
| 23 | $H_3BO_3$ / $Ca_3(PO_4)_2$ | 50 / 50 | 28.4 |

EXAMPLES 24 AND 25

These operations were conducted in the same general fashion, and with the same catalyst, as those of Examples 1–9. Here, however, the glazing composition (51% $CaCO_3$, 41% $Ca_3(PO_4)_2$, 8% MgO) was added to the hot catalyst in the muffle furnace either as a water slurry (Example 24) or as a dry powder (Example 25), each prior to the addition of the gas oil at 900° F. The glazed catalyst of Example 24 evidenced a 23% improvement in attrition resistance, while that of Example 25 was 40%.

EXAMPLE 26

In this test freshly prepared bead catalyst (87% silica, 13% alumina) was thoroughly mixed at room temperatures with 0.23 wt. percent of a powdered glazing composition containing 41% $Ca_3(PO_4)_2$, 51% $CaCO_3$ and 8% MgO. The resulting mixture was then brought rapidly to 1500° F. and held there for 30 minutes. This treatment effectively glazed the catalyst, as evidenced both by visual observation as well as by an improvement of 29% in attrition resistance, as measured in the test equipment described in connection with Examples 1–9.

EXAMPLE 27

This example illustrates the manner in which this invention is practiced in the operation of a cracking unit of the moving-bed, air-lift type, which unit was operated at a 24,000 bbl./day feed rate. In this unit, the catalyst was made up of small (ca. ⅛″) beads comprised of synthetically prepared silica-alumina and containing approximately 87% silica. The catalyst inventory was 900 tons, and catalyst was circulated through the unit at a rate of approximately 600 tons/hr. Previous to glazing, catalyst losses in the form of fines and other fragments were of the order of 15 tons/day. This loss was reduced to approximately 5 tons/day by a practice of the following procedure: A mixture of powdered chemicals, in the ratio of 52% $CaCO_3$, 40% $Ca_3(PO_4)_2$ and 8% MgO was introduced as a water slurry into the hot liquid feed to the conversion zone at a rate of 0.5 pound, per day, per ton of catalyst inventory. A gradual reduction of catalyst losses was thereafter experienced, the aforesaid level of 5 tons/day being reached at the end of the first week, when a total of 0.17% of chemicals had been added, based on catalyst weight. It was found that catalyst losses could be maintained at this extremely low level by thereafter adding the solid glaze forming material at an average rate of from about 0.3 to 0.4 pound per day, per ton of inventory, for as long as the unit remained on stream. This represented a daily addition rate of about 0.015 to 0.025 percent, in terms of the weight of catalyst present in the unit. Insofar as could be determined, glazing of the catalyst in no way impaired its activity or surface area. It should be noted that at the 5 tons/day attrition level there was a marked reduction in the fines content in the flue stack gases. This was obvious from looking at the intensity of the plume and comparing the color with that of the plume discharged by the plant previous to the step of glazing the catalyst.

EXAMPLE 28

This example illustrates the manner in which the process of this invention is employed in connection with a moving-bed catalytic cracking unit of the elevator lift type, the spent catalyst being so lifted from the reactor to the top of the regenerator and from the regenerator to the hopper above the reactor. The catalyst employed in the unit (wherein the total catalyst inventory is approximately 650 tons) is made up of synthetically prepared, silica-alumina beads of the type described above in Example 39.

Previous operation of this unit disclosed that catalyst attrition losses averaged approximately 2.6 tons per day. This loss was reduced to a value of about 1.2 tons per day by a practice of the following glazing procedure: An aqueous slurry (containing approximately one pound of dry chemicals per gallon of water) was made up from a powdered additive composition containing 41% $Ca_3(PO_4)_2$, 51% $CaCO_3$ and 8% MgO. This slurry was continuously pumped at a rate of 350 gallons per day into the liquid feed traveling to the reactor. By the end of the 10th day, when a total of 0.25% of the chemicals composition (on a dry weight basis) had been added to the unit, in terms of the 650-ton catalyst inventory, it was found that the catalyst manifested a glaze of the desired character, and that the daily catalyst attrition losses had been reduced to a level of approximately 1.2 tons per day. It was further found that catalyst losses could be maintained at this level, which appeared to be minimal for the system, by thereafter adding the slurry at the reduced rate of approximately 200 gallons per day, representing the addition to the catalyst of about 0.015% chemicals, per day, on a dry weight basis.

When a glazed siliceous particulate mass of cracking catalyst is introduced into a moving-bed type of cracking unit, no decrease in catalyst activity is observed for some little time. However, it has been observed in some plants that as the unit remains in operation for several months, activity tends to fall. This result is quite probably attributable to the fact that amounts of fresh make-up catalyst added when employing a glazed catalyst mass are much lower than would otherwise be the case. However, study of the catalyst discloses that the individual particles thereof vary widely in activity, and that the relatively less active glazed catalyst particles have a density which is appreciably greater than that of the more active glazed particles. Such relatively more dense particles can be selectively removed from the system by passing the catalyst through a specific gravity separating device of the type marketed, for example, by Sutton, Steele & Steele, Inc. The amount of inactive catalyst removed from the system in this fashion, for replacement by fresh catalyst, is relatively small and represents but a small percentage of that lost by way of attrition even when using glazed catalyst particles.

In effecting such gravity separation, the preferred practice is to treat only a portion of the catalyst being circulated in the system at any given time, as, for example, that being discharged via line 47 from elutriator 40 of the figure presented in the accompanying drawing. Such gravity separation can be effected in either a continuous or intermittent fashion. In any event, the practice of this selective gravity separation method is to offset the loss in catalyst activity occasioned in some plants by continued use of a glazed catalyst system.

We claim:

1. In a process of the moving-bed type for the catalytic cracking of petroleum hydrocarbon feeds wherein said feeds are contacted in a reaction zone, under cracking conditions, with a mass of active, particulate, downwardly gravitating siliceous catalyst, wherein hydrocarbon products and deactivated catalyst are continuously withdrawn from the reaction zone and wherein said withdrawn catalyst is reactivated by passage through a regeneration zone, with the again active catalyst then being returned to the reaction zone, the improvement which comprises continually supplying the consummate mass of particulate siliceous catalyst being circulated in the unit, while said catalyst is in the active condition, with an average of from about 0.002 to 0.25% by weight, per operating day, of a glazing composition comprising at least one glaze-forming compound selected from the group consisting of alkali metal, alkaline earth metal and boron compounds.

2. The process of claim 1 wherein the glazing composition is introduced into the hydrocarbon feed passing to the reaction zone.

3. The process of claim 1 wherein the glazing composition is supplied to the active catalyst prior to contacting the latter with the hydrocarbon feed.

4. The process of claim 1 wherein the glazing composition is supplied to the active, circulating catalyst without interruption as the cracking unit remains in operation.

5. The process of claim 1 wherein the glazing composition is supplied to the active, circulating catalyst in an intermittent fashion, but in an over-all average amount of from about 0.002 to 0.25% by weight, per operating day, as the cracking unit remains in operation.

6. The process of claim 1 wherein the catalyst being circulated in the cracking unit is comprised of a mass of particles having a microporous, catalytically active core made up of synthetic, silica-alumina material containing from about 70–90% silica, and having disposed on the particle macrosurfaces about said core a generally discontinuous, attrition-resistant glaze, said glaze extending over a substantial proportion less than the whole of the catalyst particle macrosurface.

7. The process of claim 1 wherein the catalyst being circulated in the cracking unit is comprised of a mass of particles having a microporous, catalytically active core comprised of an acid-treated, natural clay, and having disposed on the particle macrosurfaces about said core a generally discontinuous, attrition-resistant glaze, said glaze extending over a substantial proportion less than the whole of the catalyst particle macrosurface.

8. In a process of the moving-bed type for the catalytic cracking of petroleum hydrocarbon feeds wherein said feeds are contacted in a reaction zone, under cracking conditions, with a mass of active, particulate, downwardly gravitating siliceous catalyst, wherein hydrocarbon products and deactivated catalyst are continuously withdrawn from the reaction zone and wherein said withdrawn catalyst is reactivated by passage through a regeneration zone, with the again active catalyst then being returned to the reaction zone, the improvement which comprises continually supplying the consummate mass of particulate siliceous catalyst being circulated in the unit, while said catalyst is in the active condition, with an average of from about 0.002 to 0.25% by weight per operating day, of a glazing composition comprising at least one glaze-forming alkaline earth metal compound and at least one glaze-forming boron compound, said compounds being substantially free of halogen and alkali metal constituents.

9. In a process of the moving-bed type for the catalytic cracking of petroleum hydrocarbon feeds wherein said feeds are contacted in a reaction zone, under cracking conditions, with a mass of active, particulate, downwardly gravitating siliceous catalyst, wherein hydrocarbon products and deactivated catalyst are continuously withdrawn from the reaction zone and wherein said withdrawn catalyst is reactivated by passage through a regeneration zone, with the again active catalyst then being returned to the reaction zone, the improvement which comprises continually supplying the consummate mass of particulate siliceous catalyst being circulated in the unit, while said catalyst is in the active condition, with an average of from about 0.002 to 0.25% by weight, per operating day, of a glazing composition comprising at least one glaze-forming alkaline earth metal compound, said compound being substantially free of halogen components.

10. The process of claim 9 wherein the glazing composition is comprised of barium carbonate.

11. The process of claim 9 wherein the glazing composition is comprised of calcium carbonate.

12. The process of claim 9 wherein the glazing composition comprises a mixture of glaze-forming alkaline earth metal carbonates.

13. The process of claim 9 wherein the glazing composition is comprised of 1 to 25% magnesium oxide, 30 to 75% calcium carbonate and 25 to 50% calcium phosphate.

14. In a process of the moving bed type for the catalytic cracking of petroleum hydrocarbon feeds wherein said feeds are contacted in a reaction zone, under cracking conditions, with a mass of active, particulate, downwardly gravitating siliceous catalyst, wherein hydrocarbon products and deactivated catalyst are continuously withdrawn from the reaction zone and wherein said withdrawn catalyst is reactivated by passage through a regeneration zone, with the again active catalyst then being returned to the reaction zone, the improvement which comprises continually supplying the consummate mass of particulate siliceous catalyst being circulated in the unit, while said catalyst is in the active condition, with an average of from about 0.002 to 0.25% by weight, per operating day, for a glazing composition comprising at least one glaze-forming boron compound, said compound being substantially free of halogen and alkali metal components.

15. The process of claim 14 wherein the glazing composition is comprised of $B_2O_3$.

16. The process of claim 14 wherein the glazing composition is comprised of $H_3BO_3$.

17. In a process of the moving bed type for the catalytic cracking of petroleum hydrocarbon feeds wherein said feeds are contacted in a reaction zone, under cracking conditions, with a mass of active, particulate, downwardly gravitating siliceous catalyst, wherein hydrocarbon products and deactivated catalyst are continuously withdrawn from the reaction zone and wherein said withdrawn catalyst is reactivated by passage through a regeneration zone, with the again active catalyst then being returned to the reaction zone, the improvement which comprises employing as catalyst a mass of siliceous particles having a microporous, catalytically active core on which is continually maintained, over substantially less than the whole of the particle macrosurface, an adherent, attrition-resistant glaze comprised of silica and at least one alkaline earth metal compound, said compound being free of any halogen constituent and the metal component of said glaze being less than about 0.3% by weight of said catalyst particles.

18. The process of claim 17 wherein the catalyst is comprised of glazed, synthetic, silica-alumina particles containing from about 70–90% silica.

19. The process of claim 17 wherein the catalyst is comprised of glazed, acid-treated, natural clay particles.

20. The process of claim 9 wherein the catalyst is comprised of glazed, synthetic, silica alumina particles containing from about 70–90% silica.

21. The process of claim 9 wherein the catalyst is comprised of glazed, acid-treated, natural clay particle.

22. In a process of the moving bed type for the catalytic cracking of petroleum hydrocarbon feeds boiling above the gasoline range wherein said feeds are contacted in a reaction zone, under cracking conditions, with a mass of active, particulate, downwardly gravitating siliceous catalyst, wherein hydrocarbon products, at least a portion of which boil in the gasoline range, and deactivated catalyst are continuously withdrawn from the reaction zone and wherein said withdrawn catalyst is reactivated by passage through a regeneration zone, and the again active catalyst then being returned to the reaction zone, the improvement which comprises continually supplying the consummate mass of particulate siliceous catalyst being circulated in the unit, while said catalyst is in the active condition, with an average of from about 0.005% to 0.05% per weight of catalyst per operating day, of a glazing compositon comprising a mixture of a glaze forming group II metal compound and a material selected from the group consisting of boron oxide, boric acid, sodium carbonate, potassium carbonate, sodium oxide and potassium oxide by introducing said glazing composition with the hydrocarbon feed.

References Cited in the file of this patent

UNITED STATES PATENTS

| | | |
|---|---|---|
| 2,206,021 | Blunck | July 2, 1940 |
| 2,339,250 | Danforth | Jan. 18, 1944 |
| 2,340,698 | Ruthruff | Feb. 1, 1944 |
| 2,375,725 | Bailey et al. | Apr. 19, 1944 |
| 2,348,647 | Reeves | May 9, 1944 |
| 2,407,914 | Bailey | Sept. 17, 1946 |
| 2,407,918 | Burgin | Sept. 17, 1946 |
| 2,440,591 | Lewis | Apr. 27, 1948 |
| 2,564,268 | Mathy | Aug. 14, 1951 |
| 2,573,481 | Olson | Oct. 30, 1951 |
| 2,636,845 | Richardson | Apr. 28, 1953 |

UNITED STATES PATENT OFFICE
CERTIFICATE OF CORRECTION

Patent No. 3,030,300            April 17, 1962

Robert L. Flanders et al.

It is hereby certified that error appears in the above numbered patent requiring correction and that the said Letters Patent should read as corrected below.

Column 1, lines 35 and 36, for "hydrocarbon" read -- hydrocarbons --; column 4, line 23, after "$B_2O_3$," insert -- $H_3BO_3$, --; column 6, line 35, for "feed" read -- coke burning step --; line 37, for "coke burning step" read -- feed --; column 12, line 32, for "for" read -- of --.

Signed and sealed this 28th day of August 1962.

(SEAL)
Attest:

ESTON G. JOHNSON
Attesting Officer

DAVID L. LADD
Commissioner of Patents